(12) United States Patent
Lee et al.

(10) Patent No.: US 10,768,674 B2
(45) Date of Patent: Sep. 8, 2020

(54) ELECTRONIC DEVICE

(71) Applicant: LG ELECTRONICS INC., Seoul (KR)

(72) Inventors: Taegyun Lee, Seoul (KR); Junhyung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/528,396

(22) PCT Filed: Oct. 26, 2015

(86) PCT No.: PCT/KR2015/011339
§ 371 (c)(1),
(2) Date: May 19, 2017

(87) PCT Pub. No.: WO2016/080667
PCT Pub. Date: May 26, 2016

(65) Prior Publication Data
US 2017/0322591 A1    Nov. 9, 2017

(30) Foreign Application Priority Data
Nov. 21, 2014  (KR) .................. 10-2014-0163759

(51) Int. Cl.
*G06F 1/16* (2006.01)
*G06F 3/0354* (2013.01)

(52) U.S. Cl.
CPC .............. *G06F 1/169* (2013.01); *G06F 1/16* (2013.01); *G06F 1/1616* (2013.01);
(Continued)

(58) Field of Classification Search
CPC ...... G06F 3/0416; G06F 3/0414; G06F 3/041; G06F 3/016; G06F 2203/04102; G06F 2203/04103; G06F 3/0202; G06F 3/0213
See application file for complete search history.

(56) References Cited

U.S. PATENT DOCUMENTS

| 8,803,852 B2* | 8/2014 | Tsai ................ G06F 3/03547 345/173 |
| 2005/0264537 A1 | 12/2005 | Yang |

(Continued)

FOREIGN PATENT DOCUMENTS

| CN | 102053746 | 5/2011 |
| EP | 2077490 | 7/2009 |

(Continued)

OTHER PUBLICATIONS

PCT International Application No. PCT/KR2015/011339, International Search Report dated Feb. 11, 2016, 3 pages.

(Continued)

*Primary Examiner* — William Boddie
*Assistant Examiner* — Alecia D English
(74) *Attorney, Agent, or Firm* — Lee, Hong, Degerman, Kang & Waimey

(57) ABSTRACT

An electronic device is disclosed. The electronic device, according to the present invention, comprises: a first body provided with a display; a second body connected to the first body by a hinge; a through hole provided at at least one region of the second body; a touch pad assembly coupled to the through hole, and of which at least one part moves relative to the second body by a touch pressure of a user; and at least one support bar for supporting the touch pad assembly by allowing one side thereof to be coupled to the second body and the other side thereof to make contact with the touch pad assembly. According to the present invention, the touch pad assembly can be effectively supported.

11 Claims, 12 Drawing Sheets

(52) U.S. Cl.
CPC ........ *G06F 1/1681* (2013.01); *G06F 3/03547* (2013.01); *G06F 2203/04105* (2013.01)

(56) References Cited

U.S. PATENT DOCUMENTS

| | | |
|---|---|---|
| 2007/0139388 A1 | 6/2007 | Lee |
| 2010/0079404 A1* | 4/2010 | Degner ............... G06F 3/03547 345/174 |
| 2013/0050099 A1 | 2/2013 | Hirano et al. |
| 2013/0207928 A1* | 8/2013 | Takata .................... G06F 3/044 345/174 |
| 2014/0139442 A1* | 5/2014 | Clayton ............. G06F 3/03547 345/173 |
| 2014/0211396 A1 | 7/2014 | Shiroishi |

FOREIGN PATENT DOCUMENTS

| | | |
|---|---|---|
| JP | 03187144 | 11/2013 |
| KR | 2020100005048 | 5/2010 |
| KR | 101391423 | 5/2014 |

OTHER PUBLICATIONS

European Patent Office Application Serial No. 158609115, Search Report dated May 28, 2018, 9 pages.

\* cited by examiner (a)

(b)

(a)

(b)

(a)

(b)

ELECTRONIC DEVICE

CROSS-REFERENCE TO RELATED APPLICATIONS

This application is the National Stage filing under 35 U.S.C. 371 of International Application No. PCT/KR2015/011339, filed on Oct. 26, 2015, which claims the benefit of earlier filing date and right of priority to Korean Application No. 10-2014-0163759, filed on Nov. 21, 2014, the contents of which are all hereby incorporated by reference herein in their entirety.

TECHNICAL FIELD

The present invention relates to an electronic device capable of supporting a touchpad assembly in an effective manner.

BACKGROUND ART

Electronic devices such as TVs, personal computers, laptop computers, mobile phones, and tap books are evolving into multimedia players providing various functions including image or video capture, playback of music or video files, game, and reception of broadcast programs.

Electronic devices in the form of a laptop computer are being used in various applications since they provide performance higher than a predetermined level while still maintaining portability. Moreover, a mouse function is embedded into the electronic device itself to enhance portability; for example, the mouse function may be embedded into the electronic device in the form of a touchpad.

When the touchpad replaces the mouse function, it is important to allow the user to feel in the same way when operating a mouse as well as to integrate the touchpad into the electronic device.

DISCLOSURE

Technical Problem

An object of the present invention is to solve the problem described above and other related problems. And another object of the present invention is to provide an electronic device capable of supporting a touchpad assembly in an effective manner.

Technical Solution

According to one aspect of the present invention to achieve the object described above and other objects, an electronic device comprises a first body equipped with a display; a second body connected to the first body by a hinge; a through-hole formed in at least one area of the second body; a touchpad assembly being coupled to the through-hole, the touchpad assembly movable relative to the second body according to a pressure of a user; and a support bar supporting the touchpad assembly, wherein a side of the support bar is coupled to the second body, and another side of the support bar contacts the touchpad assembly.

The touchpad assembly may include: a protective sheet, a surface of the protective sheet contacted by the user's finger; a touch sensor sheet, a surface of the touch sensor sheet coupled to another surface of the protective sheet; and a reinforcement sheet coupled to another surface of the touch sensor, wherein the support bar contacts the reinforcement sheet to provide an elastic force towards the protective sheet.

The reinforcement sheet may comprise a coupling portion extended from an edge of the reinforcement sheet and coupled to the second body, wherein the touchpad assembly rotates around the coupling portion with respect to the second body when the user applies a pressure to the touchpad assembly.

A central area of the reinforcement sheet may be removed.

The coupling portion may include a plurality of coupling portions, wherein the touchpad assembly further includes a plurality of elastic plates coupled to the reinforcement sheet and the second body, and wherein the plurality of elastic plates provide the reinforcement sheet with a restoring force.

The elastic plate may include a penetrating hole and a plurality of notches formed at both edges of the elastic plate, and wherein the penetrating hole is between the plurality of notches.

The elastic plate may be comparted into a first area and a second area by the plurality of notches, and the first area and the second area are not on the same plane.

The support bar may keep in contact on the touchpad assembly.

The touchpad assembly may rotate around an edge of the touchpad assembly when the pressure is applied on the touchpad assembly, and wherein the support bar is positioned adjacent to another edge opposite to the edge.

The electronic device may further comprise: a rib extending from the reinforcement sheet; a protruding portion extending towards an outside of the reinforcement sheet from the rib; and an elastic member coupled to the second body, the elastic member positioned corresponding to the protruding portion.

The protruding portion contacts the elastic member before other areas of the touchpad assembly when the pressure on the touchpad assembly is removed.

Advantageous Effects

The advantageous effects of the present invention may be described as follows.

According to at least one of embodiments of the present invention, a touchpad assembly may be supported in an effective manner.

The additional scope of the present invention may be clearly understood from the detailed descriptions given below. However, since various modifications and changes of the present invention may be clearly understood by those skilled in the art within the technical principles and scope of the present invention, it should be understood that detailed descriptions and specific embodiments such as preferred embodiments of the present invention have been provided simply for the purpose of illustration.

MODE FOR INVENTION

Figure 1:
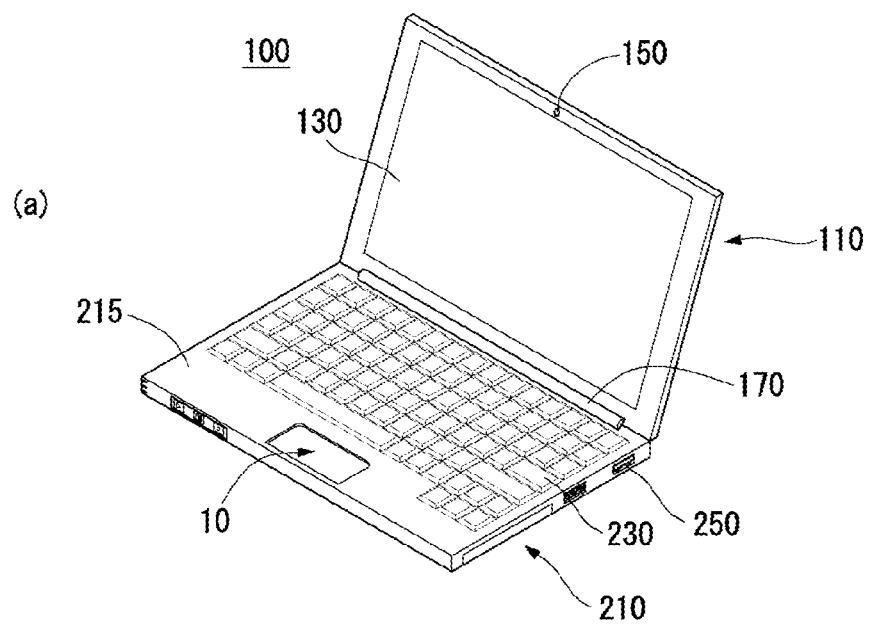
FIG. 1 illustrates an electronic device according to one embodiment of the present invention.
Figure 1:
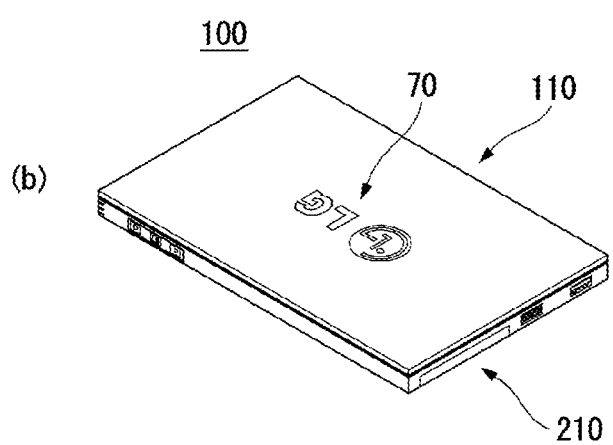

In what follows, preferred embodiments of the present invention will be described in detail with reference to appended drawings. It should be noted that the same reference numbers are assigned to the constituting elements which are the same or similar to each other irrespective of their drawing symbols and repeated descriptions thereof will be omitted. The suffixes "module" and "portion" for the constituting elements appearing in the descriptions below are assigned or used interchangeably simply for the convenience of writing this document and do not have specific meanings or roles distinguished from each other. Also, in case it is determined that specific descriptions for related technologies or methods known to the public obscure the technical principles of the embodiments disclosed in this document, the detailed descriptions thereof will be omitted. Also, it should be understood that appended drawings are intended only to help understanding the embodiments disclosed in the present document and thus do not limit the technical principles disclosed in the present document but include all of the modifications, equivalent implementations, or substitutes of the embodiments belonging to the technical principles and scope of the present invention.

The terms including ordinal numbers such as first and second may be used to describe various constituting elements, but the elements are not limited by those terms including ordinal numbers. Those terms are used only for the purpose of distinguishing one constituting element from the others.

When a constituting element is referred to as being "connected" to a different constituting element, it should be understood that the constituting element may be connected directly to the different constituting element, but a third constituting element may be present between the two elements. On the other hand, when a constituting element is referred to as being "directly connected" to another element, it should be understood that no other element is present between the two elements.

A singular expression includes plural expressions unless the context explicitly indicates otherwise.

It should be understood that the terms of "comprise" or "have" used in the present document are introduced merely to indicate existence of characteristics, numbers, steps, operations, constituting elements, components, or a combination thereof specified in the present document but do not preclude the existence of or possibility of adding one or more other characteristics, numbers, steps, operations, constituting elements, components, or a combination thereof.

Electronic devices described in this document may include laptop computers, digital broadcast terminals, PDAs (Personal Digital Assistants), PMPs (Portable Multimedia Players), navigation terminals, slate PCs, tablet PCs, and ultrabooks.

However, it should be easily understood by those skilled in the art that except for the case applicable only for mobile terminals, the structure according to embodiments of the present invention may also be applied to fixed terminals such as digital TVs, desktop computers, and digital signage.

FIG. 1 illustrates an electronic device according to one embodiment of the present invention.

As shown in the figure, an electronic device 100 according to one embodiment of the present invention may belong to either a first state in which a first 110 and a second body 210 are open or a second state in which the first 110 and the second body 210 are closed.

As shown in FIG. 1(*a*), the electronic device 100 may be in the first state. The first body 110 may be connected to the second body 210 by the hinge 170. The first body 110 may rotate relative to the second body 210 by the hinge 170. For example, while the second body 210 is fixed to the bottom surface, the first body 110 may rotate so as to be in the first state in which the display 130 of the front surface of the first body 110 is exposed to the outside.

The first body 110 may be equipped with the aforementioned display 130 and a camera 150.

The second body 210 may be equipped with a keyboard 230 obtaining key inputs from the user. The side surface of the second body 210 may be equipped with at least one interface 250. An external device may be connected to the electronic device 100 by the interface 250.

The second body 210 may be equipped with a touchpad assembly 10 capable of obtaining a touch input from the user. The touchpad assembly 10 may be located on the upper case 215 of the second body 210. Therefore, when the electronic device 100 is in the first state, the touchpad assembly 10 may be exposed to the outside.

As shown in FIG. 1(*b*), the electronic device 100 may be in the second state. The second state may be a state in which the first body 110 is in close contact with the second body 210. In the first state, the display 130 of the first body 110, the keyboard 230 of the second body 210, and the touchpad assembly 10 may not be exposed to the outside.

A logo area 70 may be prepared on the outside surface of the first body 110.

A logo of the manufacturer of the electronic device 100 and/or an icon for identifying the user of the electronic device 100 may be displayed on the logo area 70. The logo area 70 may shine brightly while the electronic device 100 is in use. For example, the lighting of the logo area 70 may be activated while the electronic device 100 is in the first state, and the lighting of the logo area 70 may be deactivated while in the second state.

Figure 2:
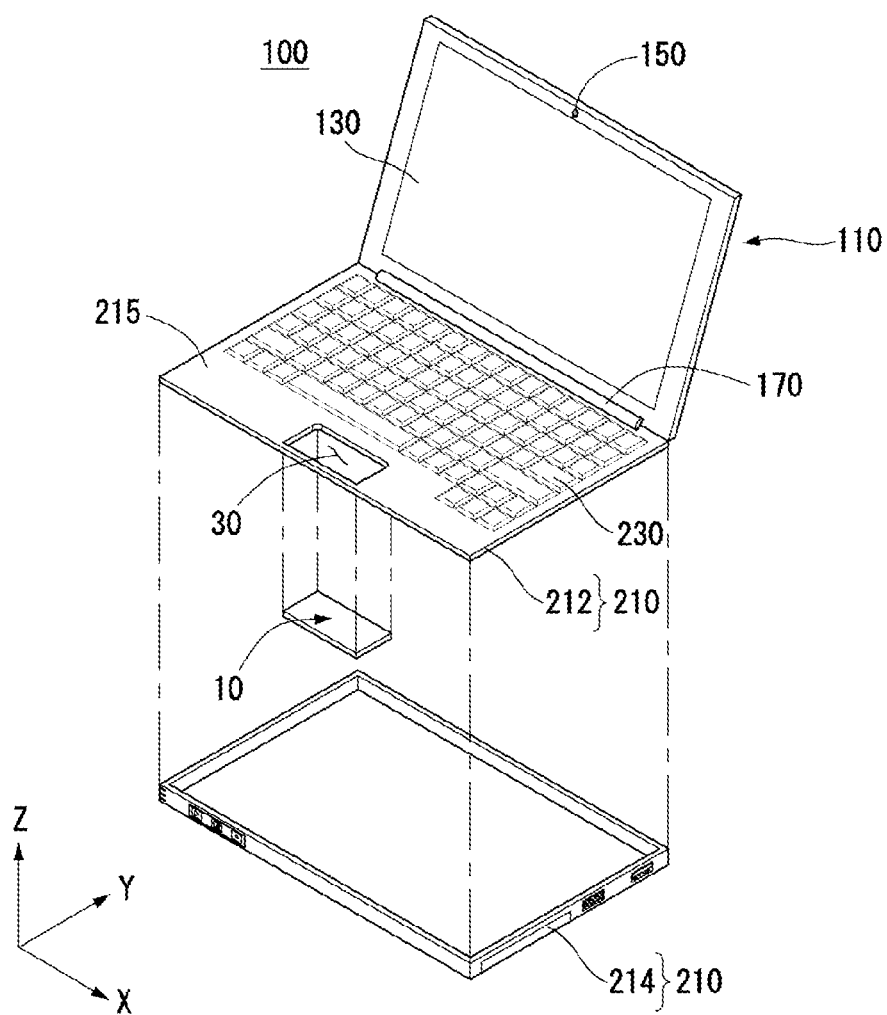
FIG. 2 illustrates a touchpad assembly of the electronic device of FIG. 1.

FIG. 2 illustrates a touchpad assembly of the electronic device of FIG. 1.

As described above, the electronic device 100 according to one embodiment of the present invention may include a touchpad assembly 10 coupled to the through-hole 30 of the second body 210.

The second body 210 may be formed as the upper case 215 is coupled to the lower case 214. In other words, various components may be installed in the space formed by coupling of the upper case 215 with the lower case 214.

The through-hole may be formed on the upper case 215. The upper case 215 may be used to form the appearance of the second body 210. The upper case 215 may be equipped with a keyboard 230 as described above.

The through-hole 30 may be formed in the lower central area of the upper case 215. The through-hole 30 may be formed to correspond to the shape of the touchpad assembly 10. The through-hole 30 may have a rectangular shape.

The touchpad assembly 10 may be a module for obtaining a touch input from the user. By using the touchpad assembly 10, the user may operate the electronic device 100 without connecting a separate device such as a mouse to the electronic device 100. For example, when a touch input from the user on the touchpad assembly 10 is sensed, body temperature of the user and/or a pressure applied by the user is detected, and a mouse pointer may be moved to a touch position and/or along a touch trajectory.

Figure 3:
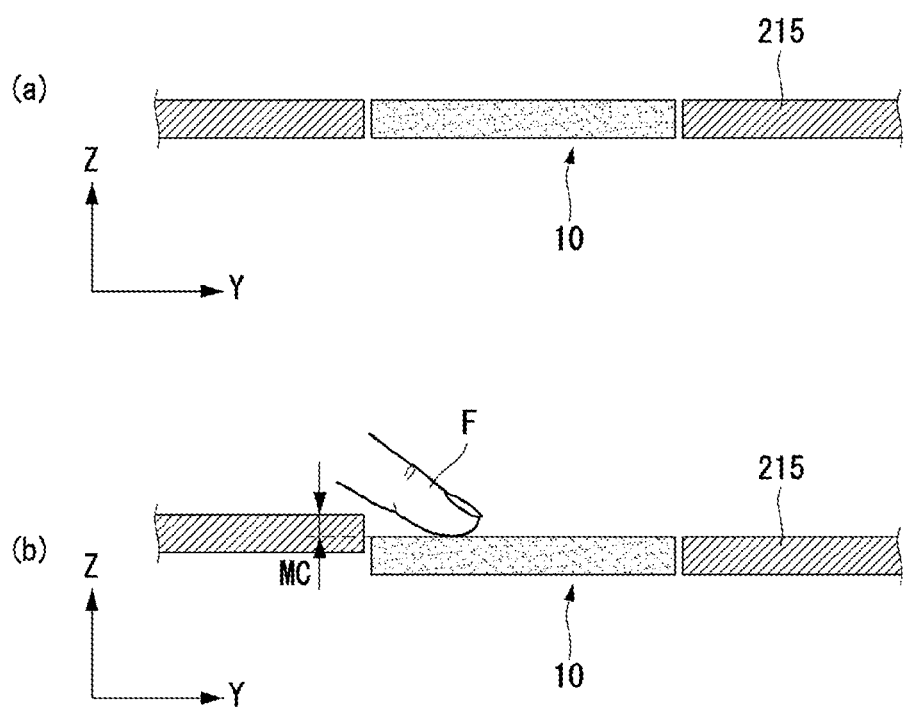
FIG. 3 illustrates operation of the touchpad assembly of FIG. 2.

FIG. 3 illustrates operation of the touchpad assembly of FIG. 2.

As described above, the touchpad assembly 10 according to one embodiment of the present invention may move a predetermined distance according to a touch pressure of the user. If the touchpad assembly 10 moves according to the touch pressure generated when the user touches the touchpad assembly 10, the user may feel a more accurate sense of touch.

As shown in FIG. 3(*a*), the upper surface of the touchpad assembly 10 may be disposed actually on the same plane as the upper case 215. In other words, when the user does not touch the touchpad assembly 10, the touchpad assembly 10 may be disposed to be integrated seamlessly with the upper case 125.

As shown in FIG. 3(*b*), the user may touch the touchpad assembly 10 by using his or her finger F. If the user touches the touchpad assembly 10, at least one part of the touchpad assembly 10 may move backwards by the movement distance MC. In other words, if the finger F generates a touch input on the touchpad assembly 10, the touchpad assembly 10 may move in proportion to the strength of the touch pressure. If the touchpad assembly 10 moves backwards, the user may feel the sense of touch similar to that sensed when he or she presses a button. Therefore, the user may more intuitively perceive that he or she has touched the touchpad assembly 10.

The movement distance (MC) may be adjusted appropriately to correspond to the touch operation of the user when the touchpad assembly 10 is assembled. For example, the touch operation of the user may include at least two types. In other words, the hovering operation of dragging a finger (F) while the finger is touching the touchpad assembly 10 and a click operation of pressing a particular point of the touchpad assembly 10 more strongly. The pressure applied during the hovering operation may be smaller than the pressure applied for the click operation. Therefore, by adjusting the repulsive force or elastic force of the touchpad assembly 10, the touchpad assembly 10 may be made not to move at the time of a hovering operation but to move backwards at the time of a click operation. Though described in detail later in the corresponding part of this document, the touchpad assembly 10 according to one embodiment of the present invention may determine whether to move and/or optimize the movement distance according to the pressure applied by the user.

Figure 4:
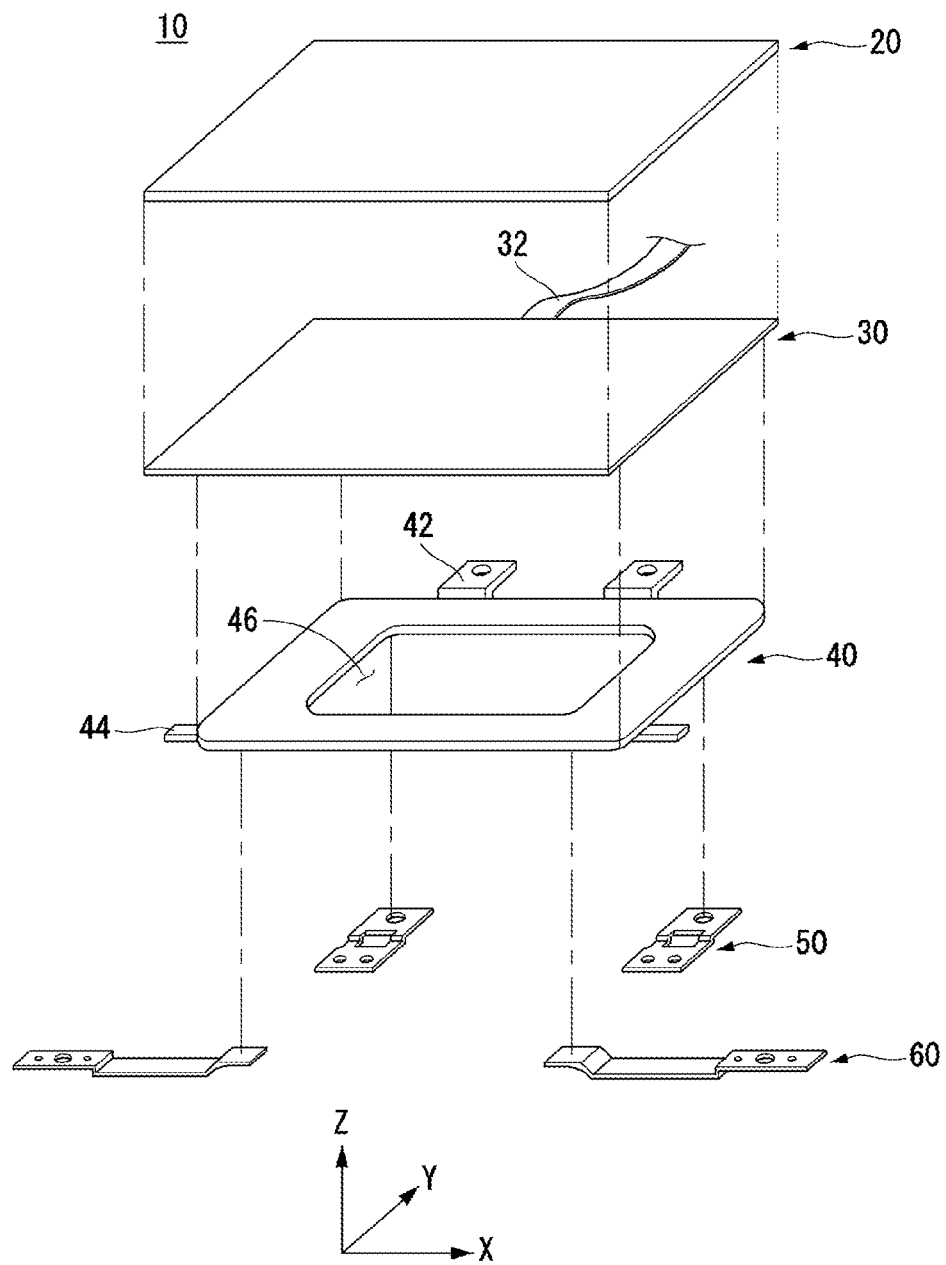
FIG. 4 is an exploded perspective view of the touchpad assembly of FIG. 2.
Figure 5:
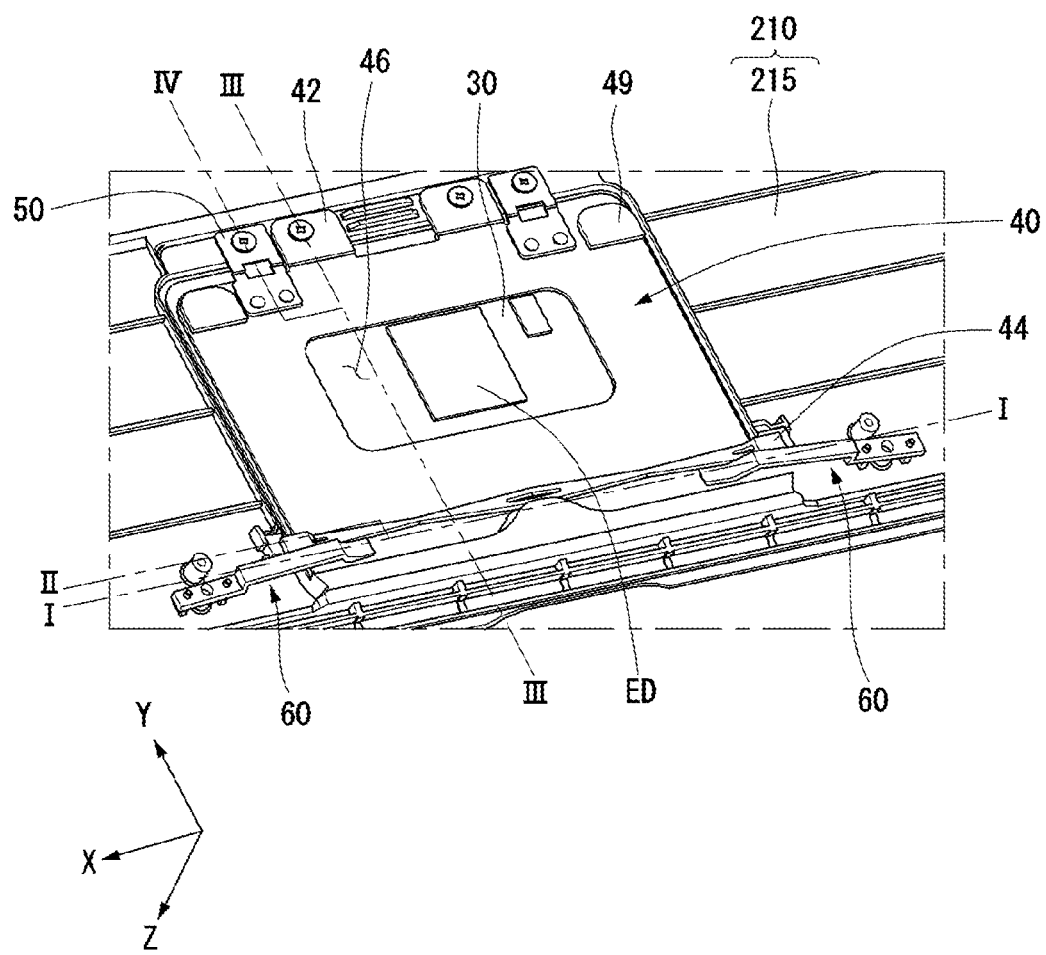
FIG. 5 illustrates a rear surface of the touchpad assembly of FIG. 2.

FIG. 4 is an exploded perspective view of the touchpad assembly of FIG. 2, and FIG. 5 illustrates a rear surface of the touchpad assembly of FIG. 2.

As shown in the figure, the touchpad assembly 10 of the electronic device 100 according to one embodiment of the present invention may include a protective sheet 20, touch sensor sheet 30, reinforcement sheet 40, elastic plate 50, and support bar 60.

The protective sheet 20 may be disposed at the top layer of the touchpad assembly 10. Therefore, the user's finger may contact the protective sheet 20 directly. The protective sheet 20 may be made of plastic material. The protective sheet 20 made of plastic material is different from the conventional one made of glass material. Therefore, it is possible to realize a protective sheet 20 lighter than the one made of glass material.

The touch sensor sheet 30 may be coupled to the rear surface of the protective sheet 20. The touch sensor sheet 30 coupled to the rear surface of the protective sheet 20 may be an actual device capable of detecting a touch input from the user. The touch sensor sheet 30 may detect a touch position and/or a touch trajectory. The detected value from the touch sensor sheet 30 may be delivered to the controller of the electronic device 20 via a touch sensor cable 32.

The reinforcement sheet 40 may be coupled to the rear surface of the touch sensor sheet 30. The reinforcement sheet 40 may provide rigidity to the touchpad assembly 10. For example, the reinforcement sheet 40, made of magnesium (Mg) plate, may be lightweight and provide high strength. The reinforcement sheet 40 may include a coupling portion 42, protruding portion 44, and central empty area 46.

The coupling portion 42 may be formed in one side edge of the reinforcement sheet 40. In other words, the coupling portion 42 may be formed as one side edge of the reinforcement sheet 40 is extended. The coupling portion 42 may comprises a plurality of coupling parts. The coupling portion 42 may be coupled to the second body 210, and the touchpad assembly 10 may be fixed to the second body 210.

The coupling portion 42 may be used as an axis around which the touchpad assembly 10 rotates. In other words, if the user applies a pressure to the touchpad assembly 10, the touchpad assembly 10 may rotate as much as the movement distance (MC) around the coupling portion 42.

The coupling portion 42 may provide elasticity to the touchpad assembly 10. In other words, the coupling portion 42 coupled to the second body 210 may provide a recovering force for the touchpad assembly 10 to return to the initial position when the resistance against the touch pressure applied by the user and/or the touch pressure of the user is removed. The coupling portion 42 may be coupled to the second body 210 by a screw.

The protruding portion 44 may be formed on both sides of the reinforcement sheet 40. For example, the protruding portion 42 may be formed at the edges different from those where the coupling portion 42 is formed. In other words, if the coupling portion 42 is formed on a first edge of the reinforcement sheet 40, the protruding portion 44 may be formed on each of a first and a second edge adjacent to the first edge.

The protruding portion 44 may correspond to an elastic member (41 of FIG. 8) attached to the second body 210. If the protruding portion 44 contacts the elastic member (41 of FIG. 8), the touchpad assembly 10 returning to the initial position due to removal of the touch pressure of the user and the second body 210 may be prevented from directly contacting with each other. Therefore, noise caused from contact of the touchpad assembly 10 with the second body 210 may be blocked.

The central empty area 46 may be formed in the central area of the reinforcement sheet 40. Electronic components (ED) may be coupled to the touch sensor sheet 30 to which the reinforcement sheet 40 is coupled. Due to the central empty area 46, electronic components (ED) may be installed on the rear surface of the reinforcement sheet 40 regardless of coupling of the reinforcement sheet 40.

The elastic plate 50 may be coupled to the touchpad assembly 10 and the second body 210. In other words, the elastic plate 50 may be coupled across the reinforcement sheet 40 of the touchpad assembly 10 and the upper case 215 of the second body 210.

The elastic plate 50 may be made of a material different from that of the reinforcement sheet 40. For example, the elastic plate 50 may be made of a metallic material such as aluminum. The elastic plate 50 made of material different from that of the reinforcement sheet 40 may provide elasticity to the touchpad assembly 10 together with the coupling portion 42 extended from the reinforcement sheet 40. In other words, the elastic force resisting a pressure applied by the user and/or elastic force returning the touchpad assembly 10 to the initial position when an applied pressure is removed may be further provided to the touchpad assembly 10 rotating around the coupling portion 42 due to the pressure applied by the user.

The elastic plate 50 may be shaped so as to provide an optimal elastic force. For example, holes may be formed in the elastic plate 50, which will be described in more detail at the corresponding part of this document.

The supporting bar 60 may support the touchpad assembly 10. In other words, the supporting bar 60 may contact the lower part of the reinforcement sheet 40 and support the touchpad assembly 10 in a upward direction. If a pressure is applied to the touchpad assembly 10 repeatedly for a long time period, position of the touchpad assembly 10 may be changed. For example, the touchpad assembly 10 may initially be located at the same position as the upper case 215, but depression may occur in the touchpad assembly 10 due to repetitive pressure force. This may readily occur when the touchpad assembly 10 is coupled to the second body 210 only by the coupling portion 42 acting as a hinge. By using the support bar 60 supporting the touchpad assembly 10 from the lower part to the upper part, the electronic device 100 according to one embodiment of the present invention may prevent the touchpad assembly from being depressed.

A plurality of support bars may form the support bar 60. For example, a plurality of support bars 60 may be located in the area adjacent to the edge opposing the edge on which the coupling portion 42 is formed. Depression of the touchpad assembly 10 may likely occur in the edge area opposing the edge on which the coupling portion 42 is formed rather than in the coupling portion 42. Therefore, a plurality of supporting bars 60, being located in the left and right side of the aforementioned edge area, may prevent the touchpad assembly 10 from being depressed.

Figure 6:
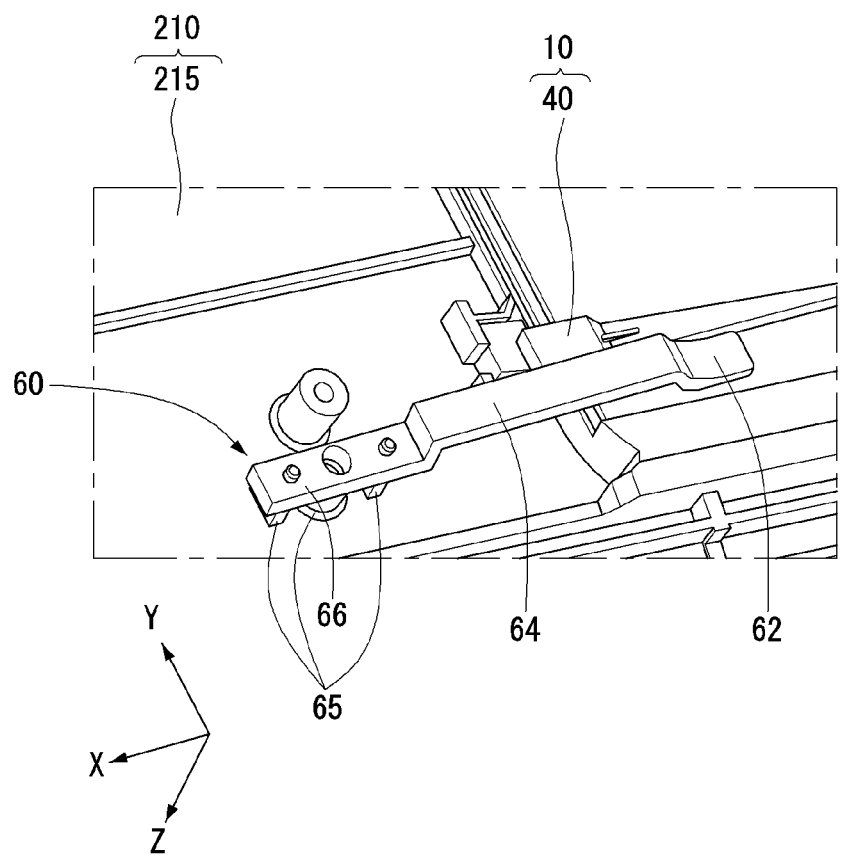
FIG. 6 illustrates a support bar of FIG. 5.
Figure 7:
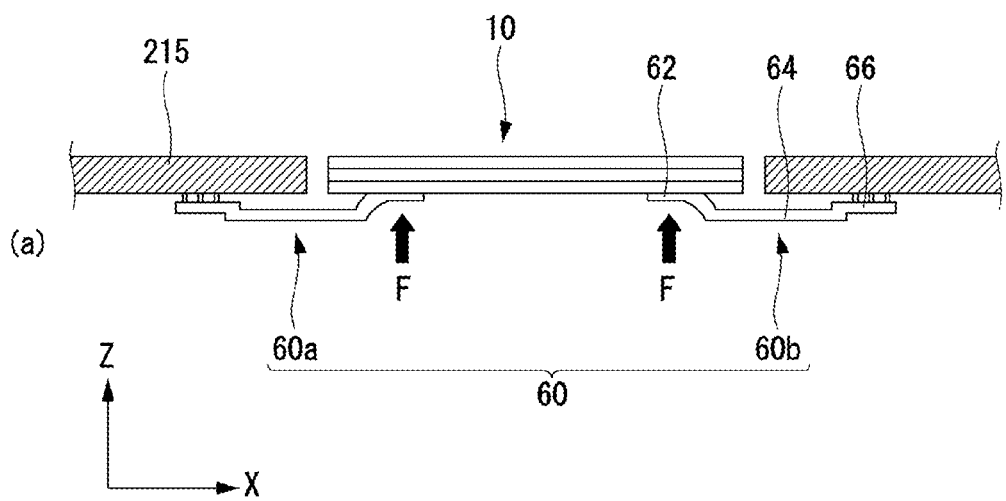
FIG. 7 illustrates the operation of the support bar of FIG. 5.
Figure 7:
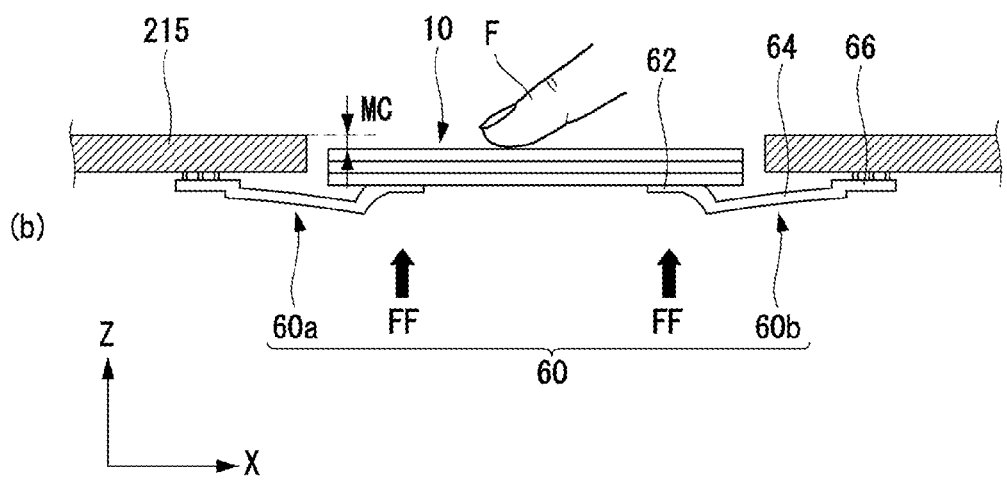

FIG. 6 illustrates a support bar of FIG. 5, and FIG. 7 illustrates the operation of the support bar of FIG. 5.

As shown in the figures, the support bar 60 of the electronic device 100 according to one embodiment of the present invention may support the touchpad assembly 10 in a upward direction, thereby preventing the touchpad assembly 10 from being depressed.

[77] As shown in FIG. 6, the supporting bar 60 may contact the reinforcement sheet 40 of the touchpad assembly 10. The supporting bar 60 may include a contacting portion 62 extended toward one side of the supporting body 64 and contacting the reinforcement sheet 40; and a fixing portion 66 extended toward the other side of the supporting body 64 and coupled to a plurality of ribs 65 extended from the upper case 215.

The contacting portion 62 may deliver the elastic force received through the supporting body 64 and the fixing portion 66 to the reinforcement sheet 40.

The fixing portion 66 may be coupled to a plurality of ribs 65 and may not be detached from a fixed position or deformed even with a repeated external force.

FIG. 7 is a cross-sectional view of FIG. 5 taken along the I-I direction.

As shown in FIG. 7(*a*), a first 60*a* and a second support bar 60*b* may be located in the left and right side of the touchpad assembly 10. The first 60*a* and the second support bar 60*b* may support the touchpad assembly 10 in a upward direction.

As shown in FIG. 7(*b*), the user's finger (F) may apply an external force to the touchpad assembly 10. The touchpad assembly 10 may move a movement distance (MC) in a downward direction due to the external force applied by the user's finger (F). In other words, the sectional area of the touchpad assembly 10 in the I-I direction may move the movement distance (MC) in a downward direction by rotating around the coupling portion 42. If the touchpad assembly 10 moves the movement distance (MC) in a downward direction, the user may feel a sense of touch more vividly.

If the touchpad assembly 10 moves due to the pressure applied by the user, the support bar 60 may apply a pressure to the touchpad assembly 10 in a upward direction with the elastic force FF. In case a pressure is not applied to the touchpad assembly 10, the support bar 60 applies a pressure to the touchpad assembly 10 with a force F. When the touchpad assembly 10 receives a pressure, an elastic force due to the touchpad assembly 10 itself may be added, and the force FF larger than the force F may be applied to the touchpad assembly 10.

If the pressure on the touchpad assembly 10 from the user disappears, the touchpad assembly 10 may return to the initial position due to the repulsive force or elastic force of the support bar 60. The repulsive force or elastic force due to the support bar 60 is provided separately from the coupling portion (42 of FIG. 42) of the touchpad assembly 10. Therefore, the support bar 60 may prevent the touchpad assembly 10 from being depressed even when the elastic force of the coupling portion (42 of FIG. 4) is weakened due to repeated use for a long time period.

Figure 8:
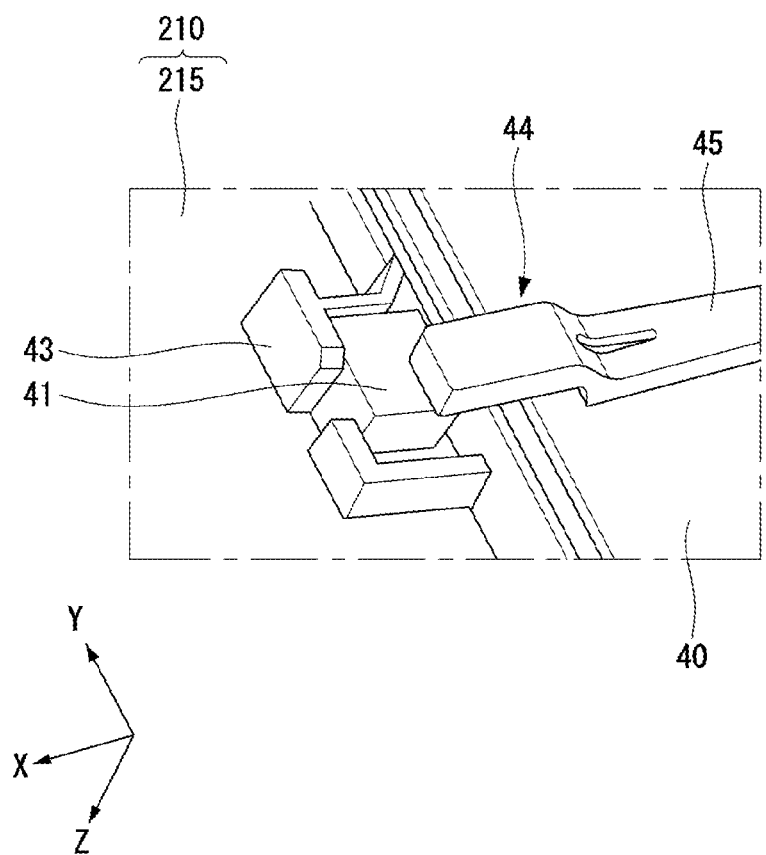
FIG. 8 illustrates a protruding portion and an elastic member of FIG. 5.
Figure 9:
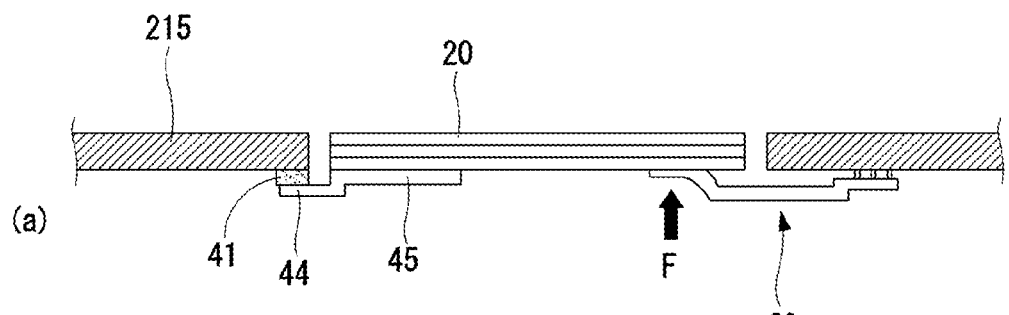
FIG. 9 illustrates the operation of the protruding portion and elastic member of FIG. 5.
Figure 9:
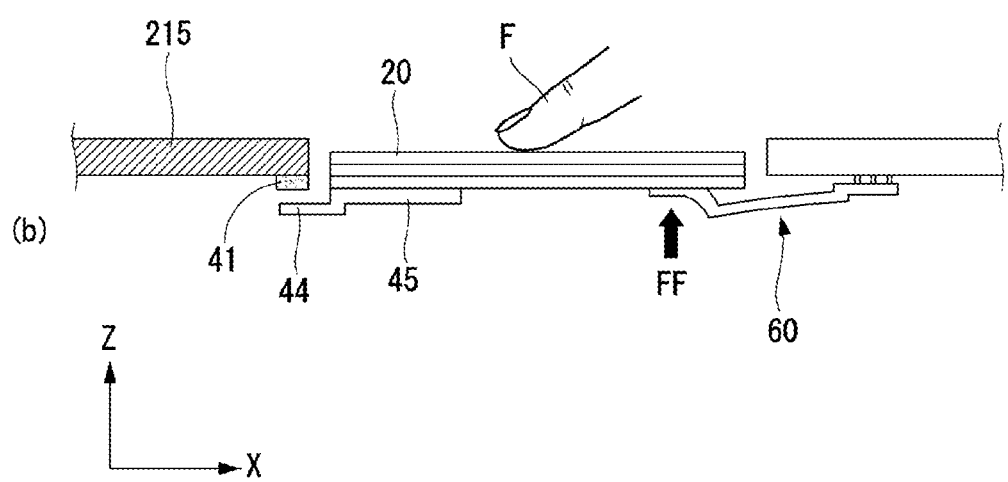

FIG. 8 illustrates a protruding portion and an elastic member of FIG. 5, and FIG. 9 illustrates the operation of the protruding portion and elastic member of FIG. 5.

As shown in the figures, the protruding portion 44 according to one embodiment of the present invention may be extended from the rib 45 formed in the reinforcement sheet 40.

As shown in FIG. 8, a rib 45 may be formed in the reinforcement sheet 40. The rib 45 may be extended to the other edge opposing one edge of the reinforcement sheet 40. The rib 45 may be disposed in a lower area of the touchpad assembly 10, where the user's touch operation is most frequently performed.

The protruding portion 44 may be extended from one end and the other end of the rib 45. The protruding portion 44 may contact the elastic member 41 attached to the upper case 215. The elastic member 41 may be coupled to the receiving portion 43 protruding from the upper case 215.

FIG. 9 is a cross-sectional view of FIG. 5 along the I-II direction.

As shown in FIG. 9(*a*), the protruding portion 44 may contact the elastic member 41 when an external force is not applied. The elastic member 41 may be made of such material as rubber or sponge, which absorbs an impact. Since the protruding portion 44 contacts the elastic member 41, the touchpad assembly 10 including the protruding portion 44 may be prevented from contacting the upper case 215 directly. Therefore, noise caused from contact of the touchpad assembly 10 with the upper case 215 may be blocked.

As shown in FIG. 9(b), the protruding portion 44 may be separated from the elastic member 41 upon receiving an external force. The separated protruding portion 44 may again contact the elastic member 41 due to the elastic force of the support bar 60 when the external force is removed. Since the protruding portion 44 contacts the elastic member 41 before any other part of the touchpad assembly 10, noise caused from movement of the touchpad assembly 10 may be minimized.

Figure 10:
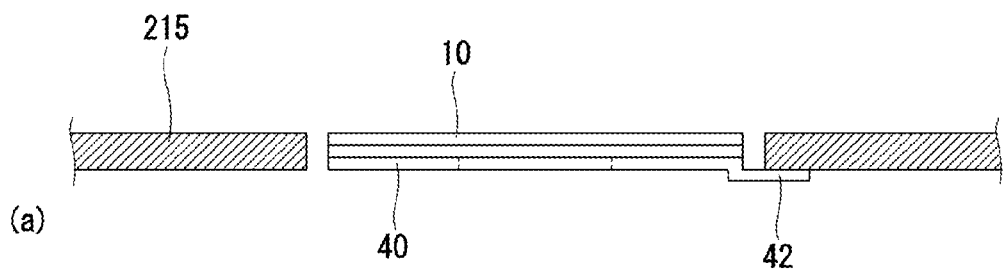
FIG. 10 illustrates the operation of a coupling portion of FIG. 5.
Figure 10:
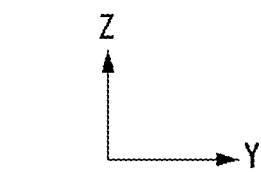
Figure 10:
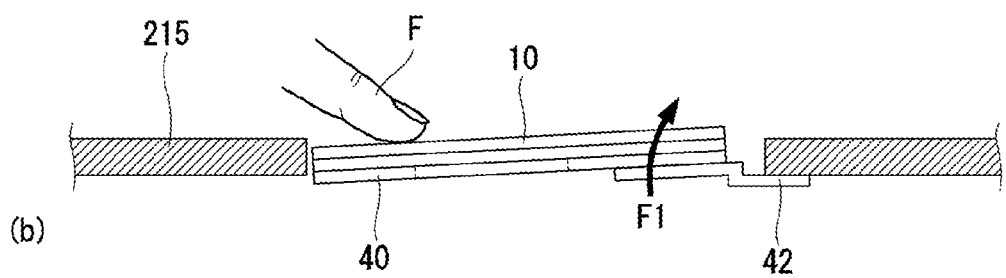
Figure 10:
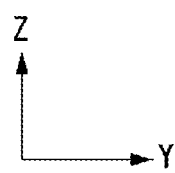

FIG. 10 illustrates the operation of a coupling portion of FIG. 5. In other words, FIG. 10 is a cross-sectional view of FIG. 5 along the III-III direction.

As shown in the figure, the coupling portion 42 may act as a hinge. In other words, the coupling portion 42 may not only act as a rotation axis of the touchpad assembly 10 but also provide an elastic force to return the touchpad assembly 10 to the initial position.

If the user applies a pressure to the touchpad assembly 10 by using his or her finger (F), the touchpad assembly 10 may rotate around the coupling portion 42. The touchpad assembly 10 rotating around the coupling portion 42 may return to the initial position due to the elastic force F1 of the coupling portion 42 itself.

Figure 11:
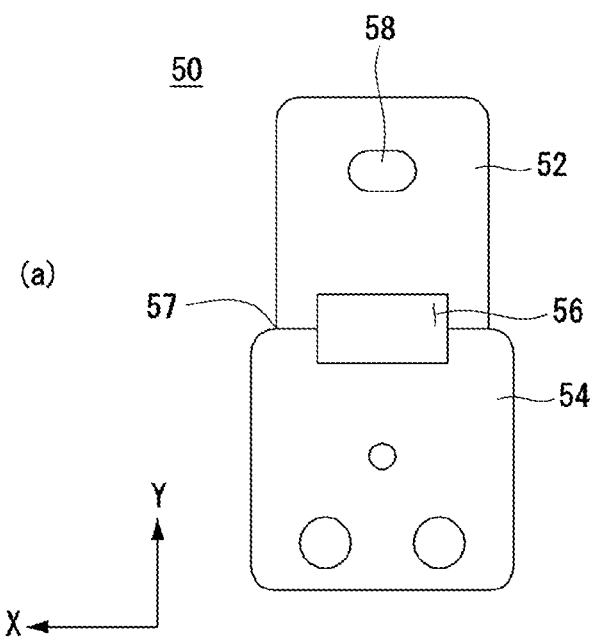
FIG. 11 illustrates an elastic plate of FIG. 5.
Figure 11:
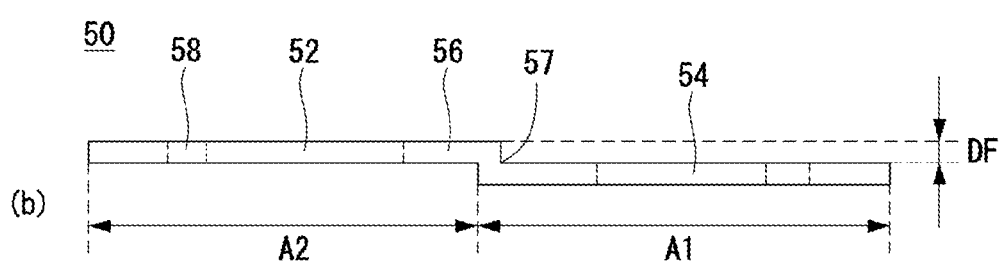
Figure 12:
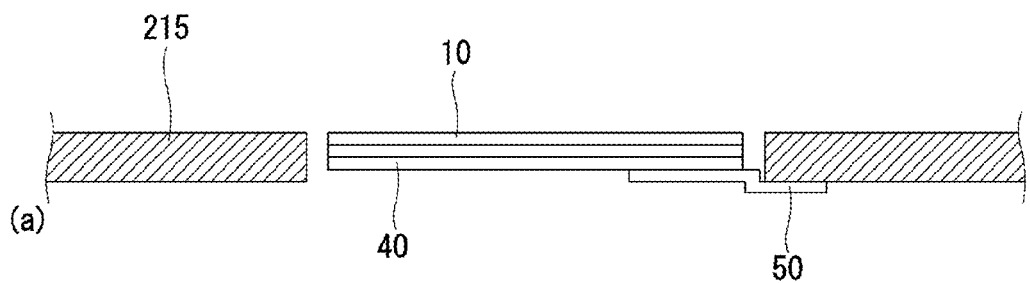
FIG. 12 illustrates the operation of the elastic plate of FIG. 5.
Figure 12:
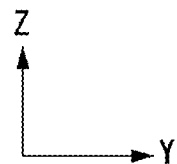
Figure 12:
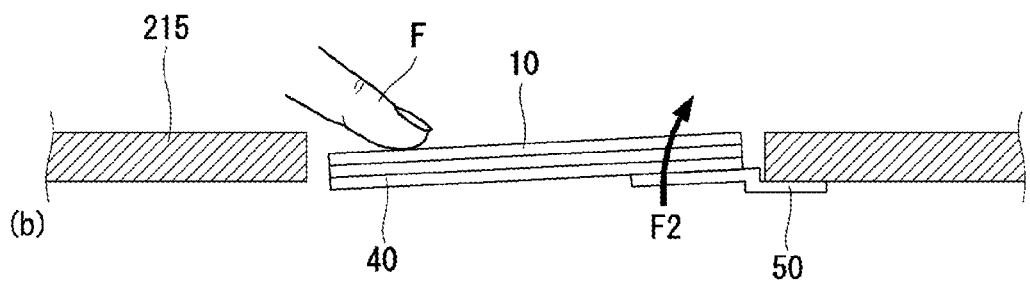
Figure 12:
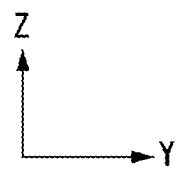

FIG. 11 illustrates an elastic plate of FIG. 5, and FIG. 12 illustrates the operation of the elastic plate of FIG. 5.

As shown in the figures, the elastic plate 50 may provide an elastic force to return the touchpad assembly 10 to the initial position together with the coupling portion 42.

As shown in FIG. 11(a), the elastic plate 50 may comprise plates. For example, the elastic plate 50 may be made of a plate-shaped metal.

The elastic plate 50 may include a through-hole 56 and a notch 57.

The through-hole 56 may be formed in one area of the elastic plate 50. For example, the through-hole 56 may be formed in the central area of the elastic plate 50.

The through-hole 56 may be used to adjust the elastic force of the elastic plate 50. For example, if the size of the through-hole 56 is increased, the elastic force of the elastic plate 50 is reduced, whereas, if the size of the through-hole 56 is decreased, the elastic force of the elastic plate 50 may be increased.

The notch 57 may be formed at the edge of the elastic plate 50. For example, the notch 57 may be formed in the left and right side of the central area of the elastic plate 50.

The notch 57 may be used to adjust the elastic force of the elastic plate 50. For example, the elastic force of the elastic plate 50 may be decreased in proportion to the size of the notch 57.

As shown in FIG. 11(b), a first area A1 and a second area A2 of the elastic plate 50 may not be disposed on the same plane. For example, the second area A2 may be formed at a lower position than the first area A1 by DF. The height difference between the first area A1 and the second area A2 may originate from the coupling position between the touchpad assembly 10 and the second body 210. For example, if the touchpad assembly 10 is coupled to the first area A1, and the second body 210 is coupled to the second area A2, the touchpad assembly 10 may be located at a position protruding more in an upward direction. Meanwhile, in the opposite case, the touchpad assembly 10 may be located at a more recessed position in an inward direction.

FIG. 12 is a cross-sectional view of FIG. 5 along the III-IV direction.

As shown in the figure, the elastic plate 50 may support the touchpad assembly 10 and provide an elastic force. In other words, the elastic plate 50 may deform elastically due to an external force applied by the user's finger (F) and provide an elastic force and/or recovering force in the F2 direction. The elastic plate 50 may perform the role of a hinge for the touchpad assembly 10 together with the coupling portion 42.

The detailed descriptions given above should not be interpreted in any aspect as limiting but should be considered illustrative. The technical scope of the present invention should be determined by reasonable interpretation of the appended claims, and all of the possible changes within the equivalent scope of the present invention belong to the technical scope of the present invention.

The invention claimed is:

1. An electronic device, comprising:
a first body equipped with a display;
a second body connected to the first body by a hinge and including an upper case and a lower case coupled to the upper case;
a through-hole formed in the upper case of the second body;
a touchpad assembly being coupled to the through-hole, the touchpad assembly movable relative to the second body according to a pressure caused by a user;
a protruding portion projecting from a lower surface of the touchpad assembly and facing a lower surface of the upper case;
an elastic member formed on the lower surface of the upper case and positioned between the upper case and the protruding portion;
an elastic plate including a first area coupled to the lower surface of the touchpad assembly and a second area extended from the first area and coupled to the lower surface of the upper case by a fastener; and
a support bar supporting the touchpad assembly,
wherein the support bar includes:
a fixing portion coupled to the second body;
a contacting portion contacting the touchpad assembly; and
a supporting body positioned between the fixing portion and contacting portion,
wherein both ends of the supporting body are bent toward the second body,
wherein the contacting portion delivers an elastic force received through the supporting body, and
wherein the protruding portion in contact with the elastic member is spaced apart from the elastic member in response to pressure applied to the touchpad assembly, the protruding portion returning to a previous position to contact the elastic member when the pressure is no longer applied.

2. The electronic device of claim 1, wherein the touchpad assembly includes:
a protective sheet, a surface of the protective sheet contacted by the user's finger;
a touch sensor sheet, a surface of the touch sensor sheet coupled to another surface of the protective sheet; and
a reinforcement sheet coupled to another surface of the touch sensor,
wherein the support bar contacts the reinforcement sheet to provide an elastic force towards the protective sheet.

3. The electronic device of claim 2, wherein the reinforcement sheet comprises a coupling portion extended from an edge of the reinforcement sheet and coupled to the second body, wherein the touchpad assembly rotates around the coupling portion with respect to the second body when the user applies a pressure to the touchpad assembly.

4. The electronic device of claim 3, wherein:
a central area of the reinforcement sheet is removed;
an electronic component is installed on the central area, and
a touch sensor cable is electrically connected to a side of the touch sensor sheet.

5. The electronic device of claim 3, wherein the coupling portion includes a plurality of coupling portions, wherein the elastic plate is coupled to the reinforcement sheet and the second body, and wherein the elastic plate provides the reinforcement sheet with a restoring force.

6. The electronic device of claim 2, further comprising:
a rib extending from the reinforcement sheet,
wherein the protruding portion extends towards an outside of the reinforcement sheet from the rib.

7. The electronic device of claim 1, wherein the elastic plate includes a penetrating hole and a plurality of notches formed at both edges of the elastic plate, and wherein the penetrating hole is between the plurality of notches.

8. The electronic device of claim 7, wherein the elastic plate is comparted into the first area and the second area by the plurality of notches, and the first area and the second area are not on the same plane.

9. The electronic device of claim 1, wherein the support bar keeps in contact on the touchpad assembly.

10. The electronic device of claim 1, wherein the touchpad assembly rotates around an edge of the touchpad assembly when the pressure is applied on the touchpad assembly, and wherein the support bar is positioned adjacent to another edge opposite to the edge.

11. The electronic device of claim 1, wherein the protruding portion contacts the elastic member before contacting other areas of the touchpad assembly when the pressure on the touchpad assembly is removed.

* * * * *